(12) United States Patent
Bouillet et al.

(10) Patent No.: US 7,809,066 B2
(45) Date of Patent: Oct. 5, 2010

(54) PACKET ERROR SIGNAL GENERATOR

(75) Inventors: Aaron Reel Bouillet, Noblesville, IN (US); Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1034 days.

(21) Appl. No.: 10/511,654

(22) PCT Filed: Apr. 11, 2003

(86) PCT No.: PCT/US03/11001

§ 371 (c)(1),
(2), (4) Date: Oct. 18, 2004

(87) PCT Pub. No.: WO03/090440

PCT Pub. Date: Oct. 30, 2003

(65) Prior Publication Data

US 2005/0226339 A1    Oct. 13, 2005

Related U.S. Application Data

(60) Provisional application No. 60/373,203, filed on Apr. 17, 2002.

(51) Int. Cl.
*H04N 7/12* (2006.01)
(52) U.S. Cl. .............. 375/240.27; 375/240; 375/240.01
(58) Field of Classification Search ................. 375/240, 375/240.01, 240.12, 240.25, 240.26, 240.27; 380/216; 386/85
See application file for complete search history.

(56) References Cited

U.S. PATENT DOCUMENTS 5,247,363 A    9/1993  Sun et al.

(Continued)

FOREIGN PATENT DOCUMENTS

EP    0750921    1/1997

(Continued)

OTHER PUBLICATIONS

Search Report Dated Aug. 24, 2004.

*Primary Examiner*—Allen Wong
(74) *Attorney, Agent, or Firm*—Robert D. Shedd; Joseph J. Opalach

(57) ABSTRACT

A software packet error system for a High Definition Television (HDTV) receiver. A data packet error signal is transferred from a forward error correcting Reed-Solomon decoder to a transport processor. In response to a segment sync signal, the transport processor generates an error signal which appears on a programmable output pin. The software packet error signal is synchronized with the outgoing data packet signal such that each data packet is bracketed or framed by its associating packet error signal. Precession of the start of the data packets forwarded on the transport but relative to the start of the data packets appearing at the output of the decoder occurs as a result of a training packet generated for every 312 data packets. The precession is reset at the beginning of every field and is predictable across the field duration with sufficient accuracy to make the software packet error mechanism feasible.

4 Claims, 4 Drawing Sheets

System

U.S. PATENT DOCUMENTS

| | | |
|---|---|---|
| 5,465,267 A | 11/1995 | Todoroki |
| 5,506,903 A * | 4/1996 | Yamashita .................. 380/216 |
| 6,097,879 A * | 8/2000 | Komatsu et al. .............. 386/85 |
| 6,317,462 B1 * | 11/2001 | Boyce .................. 375/240.27 |

FOREIGN PATENT DOCUMENTS

| | | |
|---|---|---|
| JP | 5-130420 | 5/1993 |
| JP | 8-130706 | 5/1996 |
| JP | 10-136320 | 5/1998 |
| JP | 2001-339522 | 12/2001 |

* cited by examiner

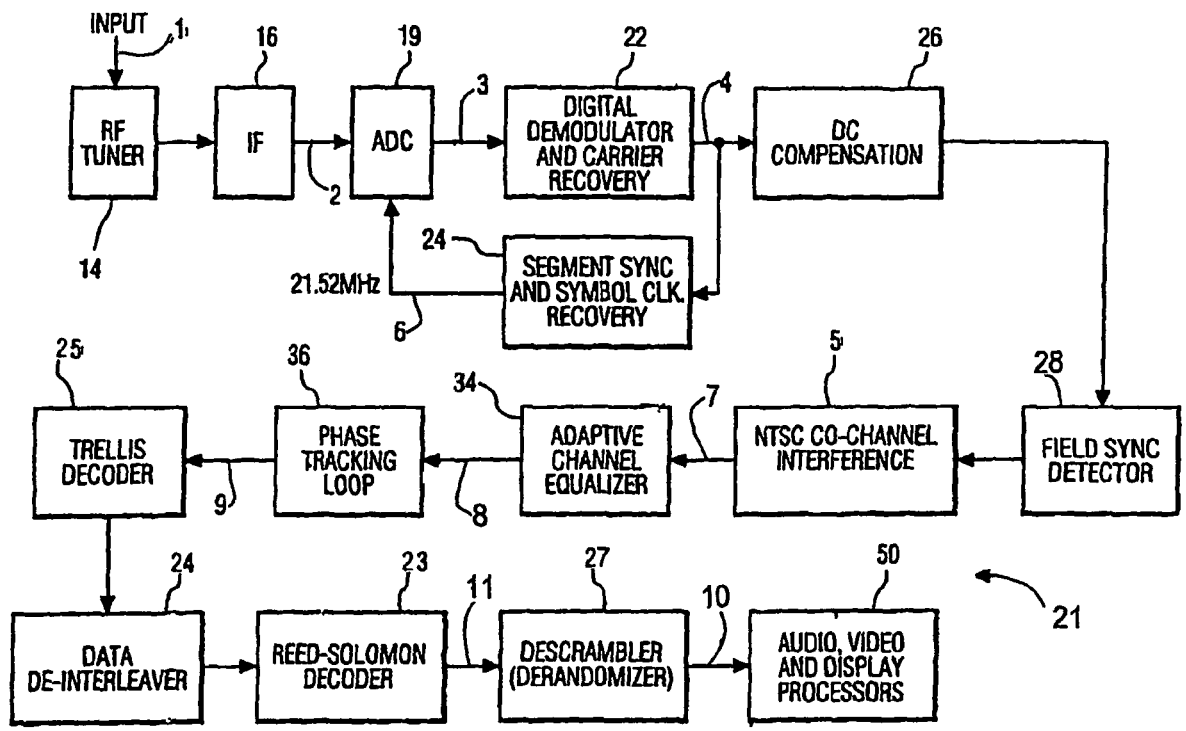
Fig. 1 – Prior art

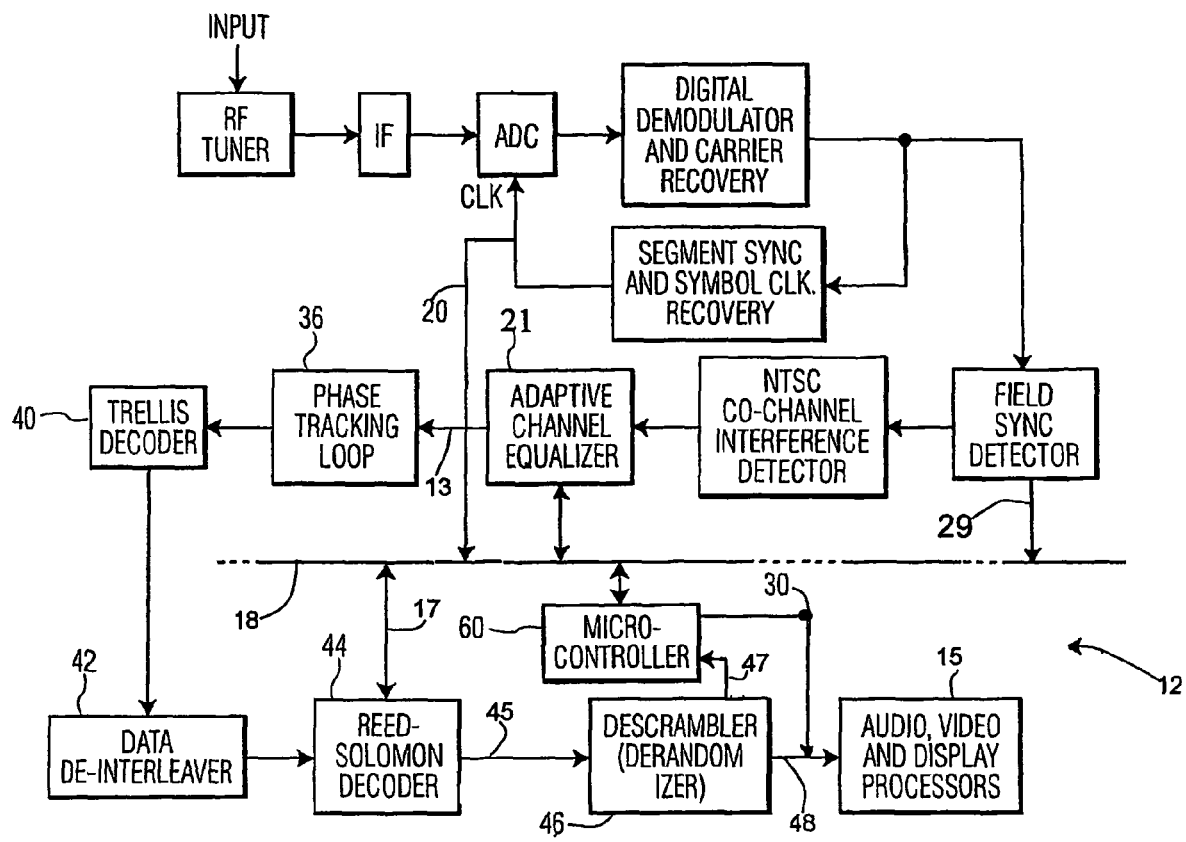
Fig. 2 – System
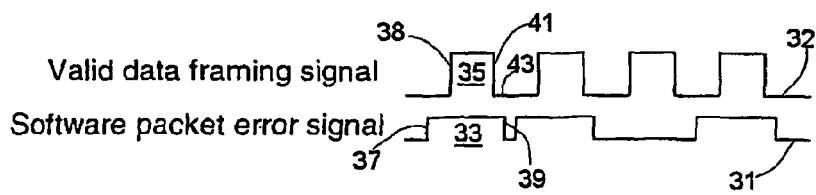
Fig. 3 – Waveforms
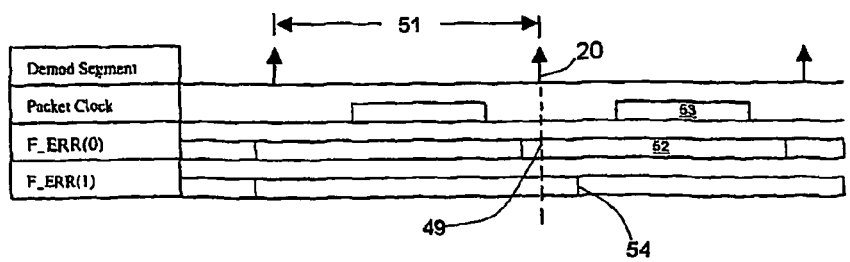
Fig. 4 – Timing

| | | | | | | |
|---|---|---|---|---|---|---|
| 001 | bclr | 2, int_stat1 | | 039 | ora | #1 |
| 002 | lda | ms_timer_count | | 040 | bra | apply_gate |
| 003 | inca | | | 041 | lda | PCNTL |
| 004 | sta | ms_timer_count | | 042 | and | #0xFE |
| 005 | lda | #0x6D | | 043 | sta | i_temp0 |
| 006 | sta | CAP_RAM_TRIG | | 044 | lda | sw_ferr_cnt+1 |
| 007 | lda | #0x2D | | 045 | add | #1 |
| 008 | sta | CAP_RAM_TRIG | | 046 | sta | sw_ferr_cnt+1 |
| 009 | lda | CAP_RAM_BASE | | 047 | lda | sw_ferr_cnt |
| 010 | and | #0x80 | | 048 | adc | #0 |
| 011 | ldx | ng_prt_in | | 049 | sta | sw_ferr_cnt |
| 012 | sta | next_gate, x | | 050 | lda | i_temp0 |
| 013 | txa | | | 051 | sta | PCNTL |
| 014 | eor | #1 | | 052 | txa | |
| 015 | sta | ng_ptr_in | | 053 | eor | #1 |
| 016 | inc | pkt_cnt | | 054 | sta | ng_ptr_out |
| 017 | lda | pkt_cnt | | 055 | ldx | field_flag |
| 018 | cmp | #170 | | 056 | beq | no_field |
| 019 | bne | enb_wait | | 057 | lda | sync_cnt |
| 020 | lda | #1 | | 058 | inca | |
| 021 | sta | ferr_dly | | 059 | sta | sync_cnt |
| 022 | jmp | chk_field | | 060 | cmp | #55 |
| 023 | lda | ferr_dly | | 061 | bne | no_field |
| 024 | nop | | | 062 | clr | field_flag |
| 025 | deca | | | 063 | lda | #15 |
| 026 | bne | ferr_delay_idle | | 064 | sta | ferr_dly |
| 027 | lda | ferr_mod | | 065 | clr | pkt_cnt |
| 028 | inca | | | 066 | clr | ferr_mod |
| 029 | cmp | #3 | | 067 | clr | ng_ptr_in |
| 030 | bne | store_ferr_mod | | 068 | clr | ng_ptr_out |
| 031 | inc | ferr_dly | | 069 | rts | |
| 032 | clra | | | 070 | bclr | 1, int_stat1 |
| 033 | sta | ferr_mod | | 071 | inc | field_flag |
| 034 | ldx | ng_ptr_out | | 072 | lda | ng_ptr_out |
| 035 | lda | next_gate, x | | 073 | eor | #1 |
| 036 | ora | ferr_enable | | 074 | sta | ng_ptr_out |
| 037 | bne | gate_on | | 075 | clr | sync_cnt |
| 038 | lda | PCNTL | | 076 | rts | |

Fig. 5 – Listing

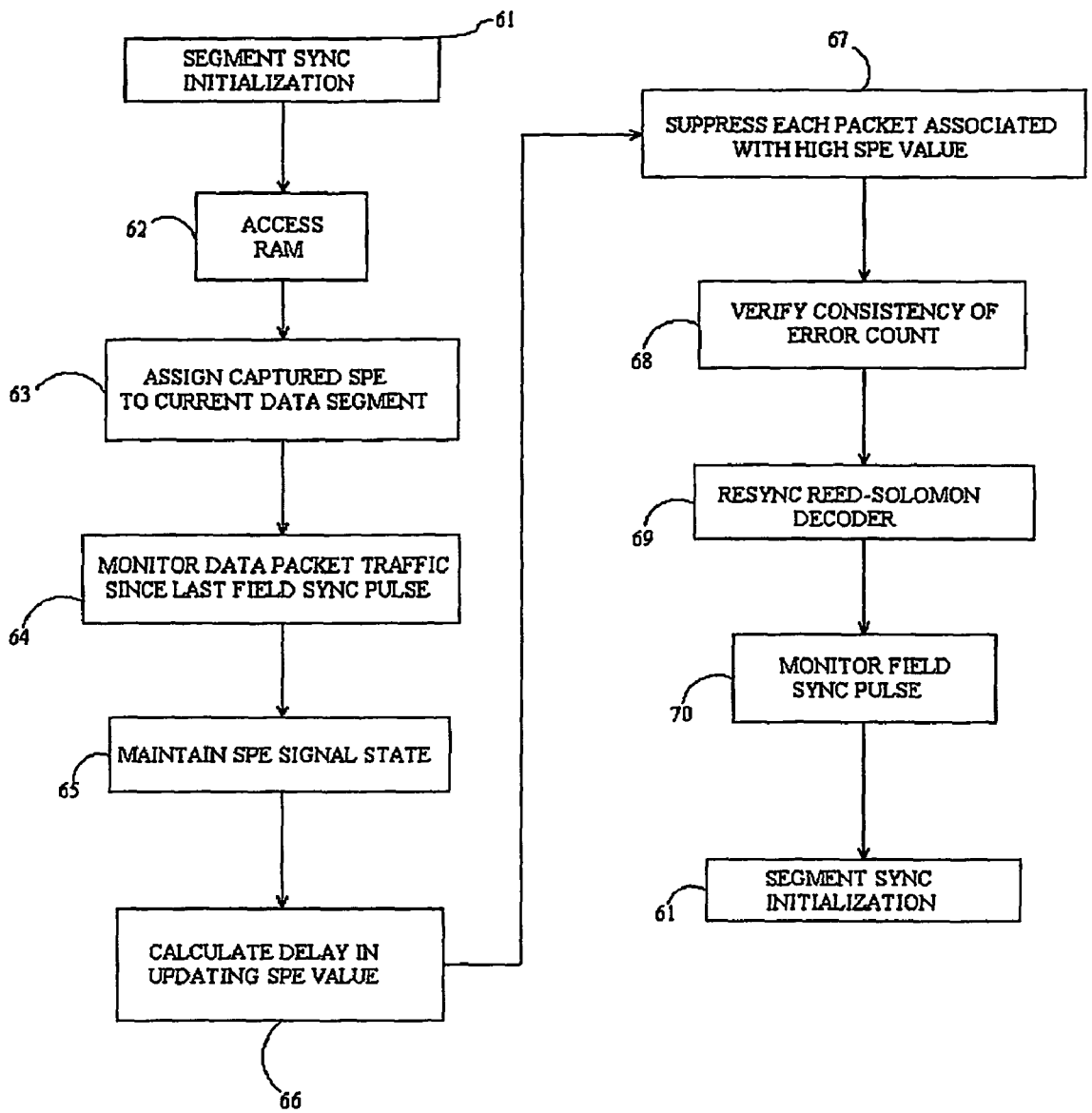
Fig. 6 - Flowchart

US 7,809,066 B2

PACKET ERROR SIGNAL GENERATOR

This application claims the benefit, under 35 U.S.C. §365 of International Application PCT/US03/11001, filed Apr. 11, 2003, which was published in accordance with PCT Article 21(2) on Oct. 30, 2003 in English and which claims the benefit of United States Provisional Patent Application No. 60/373,203, filed Apr. 17, 2002.

FIELD OF THE INVENTION

This invention relates to generally to a method and apparatus for processing a high definition television (HDTV) signal, and more particularly to the generation of error signals by means of software rather than hardware.

BACKGROUND OF THE INVENTION

An example of a portion of a prior art HDTV system 21 is depicted in FIG. 1. In such a system, a terrestrial analog broadcast signal 1 is forwarded to an input network or front end that includes an RF tuning circuit 14 and an intermediate frequency processor 16 including a double conversion tuner for producing an IF passband output signal 2. The broadcast signal 1 is a carrier suppressed eight bit vestigial sideband (VSB) modulated signal as specified by the Grand Alliance for HDTV standards. Such a VSB signal is represented by a one dimensional data symbol constellation where only one axis contains data to be recovered by the receiver 21. The passband IF output signal 2 generated by IF unit 316 is converted to an oversampled digital symbol datastream by an analog to digital converter (ADC) 19. The output oversampled digital datastream 3 is demodulated to baseband by a digital demodulator and carrier recovery network 22.

The recovery of data from modulated signals conveying digital information in symbol form usually requires that three functions be performed by receiver 21. First is timing recovery for symbol synchronization, second is carrier recovery (frequency demodulation to baseband), and finally channel equalization. Timing recovery is a process by which a receiver clock (timebase) is synchronized to a transmitter clock. This permits a received signal to be sampled at optimum points in time to reduce slicing or truncation errors associated with decision directed processing of received symbol values. Adaptive channel equalization is a process of compensating for the effects of changing conditions and disturbances on the signal transmission channel. This process typically employs filters that remove amplitude and phase distortions resulting from frequency dependent, time variable characteristics of the transmission channel, thereby improving symbol decision capability.

Carrier recovery is a process by which a received RF signal, after being converted to a lower intermediate frequency passband (typically near baseband), is frequency shifted to baseband to permit recovery of the modulating baseband information. A small pilot signal at the suppressed carrier frequency is added to the transmitted signal 1 to assist in achieving carrier lock at the VSB receiver 21. The demodulation function performed by demodulator 22 is accomplished in response to the reference pilot carrier contained in signal 1. Unit 22 produces as an output a demodulated symbol datastream 4.

ADC 19 oversamples the input 10.76 Million Symbols per second VSB symbol datastream 2 with a 21.52 MHz sampling clock (twice the received symbol rate), thereby providing an oversampled 21.52 Msamples/sec datastream with two samples per symbol. The advantage of using a two sample per symbol scheme as compared to one sample per symbol is the ability to use symbol timing recovery schemes such as the Gardner symbol timing recover method.

Interconnected to ADC 19 and demodulator 22 is a segment sync and symbol clock recovery network 24. The network 24 detects and separates from random noise the repetitive data segment sync components of each data frame. The segment sync signals 6 are used to regenerate a properly phased 21.52 MHz clock which is used to control the datastream symbol sampling performed by ADC 19. A DC compensator 26 uses an adaptive tracking circuit to remove from the demodulated VSB signal 4 a DC offset component present in the pilot signal. Field sync detector 28 detects the field sync component by comparing every received data segment with an ideal field reference signal stored in the memory of the receiver 21. The field sync detector 28 also provides a training signal to channel equalizer 34. NTSC interference detection and filtering are performed by unit 5, an example of which is disclosed in U.S. Pat. No. 5,512,957, entitled METHOD AND APPARATUS FOR COMBATING CO-CHANNEL NTSC INTERFERENCE FOR DIGITAL TV TRANSMISSION, issued on Apr. 30, 1996, to Hulyalkar. Afterwards, the signal 7 is adaptively equalized by channel equalizer 34 which may operate in a combination of blind, training and decision directed modes. An example of an adaptive channel equalizer is disclosed in U.S. Pat. No. 6,490,007, entitled ADAPTIVE CHANNEL EQUALIZER, issued on Dec. 3, 2002 to Bouillet et al. The output datastream from NTSC filter 5 is converted to a one sample/symbol (10.76 Msymbol/sec) datastream prior to reaching equalizer 34.

Equalizer 34 corrects channel distortions, but phase noise randomly rotates the symbol constellation. Phase tracking network 36 removes the residual phase and gain noise in the output signal received from equalizer 34, including phase noise which has not been removed by the preceding carrier recovery network 22 in response to the pilot signal. The phase corrected output signal 9 of tracking network 36 is then trellis decoded by unit 25, deinterleaved by unit 24, Reed-Solomon error corrected by unit 23 and descrambled by unit 27. The final step is to forward the decoded datastream 10 to audio, video and display processors 50.

In the receiver 21, the output signal 11 of the Reed-Solomon decoder 23 includes data sent in packets for subsequent processing by the audio, visual and display processors 50. The data is accompanied by a data framing signal, a clock signal, and an error signal that indicates whether or not the decoder 23 detected an uncorrectable error in the data packet. Typically, the decoder unit 23 generates the error signal via circuitry within the decoder 23 dedicated to this purpose. However, if the error generating hardware does not work correctly, additional expense must be incurred by incorporating hardware in subsequent stages that will assist in the generation of the error detection signal. Ideally, a software based solution is needed which will eliminate the need for including redundant error detection circuitry in an HDTV receiver.

BRIEF SUMMARY OF THE INVENTION

The present invention utilizes a transport processor, implemented as a microprocessor to execute software instructions within an HDTV receiver to generate an error signal when the receiver demodulator detects an uncorrectable error within a data packet. A packet error signal is generated by the forward error correcting Reed-Solomon decoder residing within the demodulator integrated circuit package. The integrated circuit includes a programmable output pin which generates a software packet error signal that is synchronized with the outgoing data packets. The error signal has a duration greater than its associated data packet, and is programmed to begin before and end after its associated data packet. In this manner, the error signal completely brackets or frames the underlying data packet.

The software packet error signal is made available to the microprocessor by utilizing a different timing scheme than the one used to advance data packets on the transport processor bus. Every 313th data packet is training data generated by the field sync detector for use by the adaptive channel equalizer. The training data packet is not sent to the transport processor. The missing 313th data packet creates a gap in the data stream that is concealed by adding a small increment of time to the gaps existing between the remaining 312 data packets that are eventually sent to the transport processor.

This added time has the effect of causing the start time of the 312 data packets on the transport bus to begin earlier than the start time of the data packets appearing at the output of the Reed-Solomon decoder. This precession effect is reset at the beginning of each data field and is predictable across the duration of each data field.

BRIEF DESCRIPTION OF THE DRAWING

FIG. 1 is a block diagram of a portion of a prior art high definition television receiver;

FIG. 2 is a block diagram of a portion of a high definition television receiver constructed according to the principles of the present invention.;

FIG. 3 is a timing diagram depicting the synchronization of a data signal and a software packet error signal as utilized by the invention depicted in FIG. 2;

FIG. 4 is a timing diagram depicting transmission of the software packet error signal according to the principles of the present invention;

FIG. 5 is a microcode listing that permits implementation of the present invention; and FIG. 6 is a flow chart depicting the implementation and operation of the present invention.

DETAILED DESCRIPTION OF THE INVENTION

In FIG. 2 a portion of an HDTV receiver 12 is depicted. The phase corrected signal 13 from equalizer 21 is trellis decoded by unit 40, then deinterleaved by unit 42. Decoded and deinterleaved data packets from unit 40 are error detected and corrected by a forward error correcting (FEC) unit 44 such as a Reed-Solomon error detecting and decoding network. Error corrected packets from unit 44 are descrambled (derandomized) by unit 46. Transport processor 60 provides appropriate timing control and clock signals for other elements of the receiver 12 and also serves as a data communications link between the various networks that make up the receiver 12. In the illustrated embodiment, the transport processor 60 is implemented as a microprocessor 60 executing software instructions to operate in a manner described in more detail below. Error corrector 44 and microprocessor 60 cooperate to control the operation of equalizer 21. Afterwards, a decoded datastream is subjected to audio, video and display processing by unit 15.

The packet error rate is a measurement performed within the FEC unit 44 based on well known FEC algorithms which are capable of determining when a packet contains more errors than can be corrected. The FEC generates a packet error signal 17 which is forwarded to microprocessor 60 via bus 18. Other synchronization signals such as the segment sync signal 20 and the field sync signal 29 are also sent to bus 18, and when the packet error signal 17 is sensed by microprocessor 60, the arrival of one of the other synchronization signals 20 or 29, for example, triggers the creation of a software packet error (SPE) which appears on programmable output pin 30. Referring also to FIG. 3, the SPE signal 31 is generated so as to be synchronized with the outgoing data packet signal 32. In particular, each error signal 33, for example, frames or brackets its associated data packet 35. The leading edge 37 of SPE 33 occurs earlier in time than the leading edge 38 of the associated data packet 38. Similarly, the trailing edge 39 of the SPE 33 occurs later in time than the trailing edge 41 of the data packet 35.

This bracketing or framing characteristic of the SPE 31 is important because the error signal 17 available to microprocessor 60 uses a different timing scheme than the data packets 35 appearing on the transport bus 48. Every 313th data packet is in fact training data for the adaptive channel equalizer 21 and so is not forwarded to the transport bus 48. The missing 313th packet creates a gap in the sequence of data packets that is redistributed by the data deinterleaver 42 which adds an additional increment of time to the space 43 existing between each of the remaining 312 data packets which are actually forwarded to the transport bus 48. The time that is added to the gaps 43 has the effect of causing the leading edge 38 of each data packet 35 to appear on the transport bus 48 at a time that is earlier than the appearance of the same data packets at the output 45 of the Reed-Solomon decoder 44. This precession effect is reset at the beginning of each data field, and is predictable across the duration of the each field.

The software packet error signal 31 associated with the current segment sync signal appearing on the derandomizer test bus 47 is sent at the same time as the data packet associated with the next segment is sent to the transport bus 48. In this manner, the microprocessor 60 receives the packet error signal at least one segment prior to the time that the packet error signal must be used. In other words, the packet error signal must advance from the derandomizer test bus 47 and be available for use on programmable output pin 30 at the arrival of the next segment sync signal 20 with sufficient time to encompass the beginning and end of the packet clock signal appearing on transport bus 48 and with enough margin to accommodate system clock rate variations.

Each data packet clock pulse is delayed by a slightly larger amount than the preceding clock pulse with respect to the segment sync signal 20 in order to evenly distribute across the entire data field the sync gap caused by the missing training signal data packet. The microprocessor 60 monitors the segment count relative to the field sync signal 17 of Reed-Solomon decoder 44 and delays the transition of the software packet error signal 31 so that the transition occurs between packet enable signals appearing on the transport bus 48. At some point the timing scenario becomes that depicted in FIG. 4, i.e. the packet error signal F_ERR(0) is generated by waiting almost to the end 49 of the packet interval 51 before transitioning to the value 52 for the next packet 53. Unfortunately, the microprocessor 60 must consume processing time during this waiting period. A better approach is to skip outputting the F_ERR signal for one packet and reset the F_ERR output to occur shortly after the sync signal associated with subsequent packets. The error signal transition 54 thus occurs shortly after the sync signal 20 appears, as is the case with error signal F_ERR (1). The segment sync signal to skip must be selected properly to avoid misframing the outgoing packets. There will typically be more than one such segment sync signal which may be skipped.

The timing protocol of packet error signal 31 with respect to the segment sync signal 20 is reset for the first packet occurring after the Reed-Solomon field sync signal 17. This causes the packet clock and the error signal 31 to maintain the timing relationship illustrated in FIG. 4. However, the demodulator field sync signal 29 drives the interrupt of microprocessor 60 and occurs 55 segment sync pulses prior to the field sync pulse 17 associated with decoder 44. In order to compensate for the 55 segment delay, the packet error signal 31 is not reset until 55 segment sync pulses have occurred following the demodulator field sync pulse 29.

Since one segment sync signal 20 has been used instead as training data, only 312 segment sync signals 20 appear on the randomizer test bus 47. Assuming a clock speed of 10.76 MHz, the missing segment sync signal appears 13 microseconds prior to the demodulator field sync pulse 29. Since the packet error signal 31 generated in response to the missing segment does not correspond to a data packet being forwarded along the transport bus 48, this particular error signal must be discarded. This is accomplished by incrementing the read pointer in the field sync register of microprocessor 60. At the time this increment occurs, the write pointer is already one pulse ahead of the read pointer, as illustrated in FIG. 4, so the software packet error signal 31 remains available in advance of when it is needed to frame its associated data packet.

Referring also to FIG. 5 and 6, the microcode listing used to implement the aforementioned functions can be inspected. Lines 001-069 address the manipulation of segment sync signal 20, while lines 070-076 deal with the field sync signal 29. At step 61, lines 001-004 perform initialization functions, such as clearing the interrupt status bit and updating the segment sync counter for the one microsecond timer. The actual software packet error generation steps begins at step 62 with lines 005-008, and include the restarting and resetting of the capture state machine and allowing the microprocessor 60 access to the random access memory. Lines 009-015 (step 63) take the captured software packet error signal 31 and set it up on the current data segment in order to gate the next outgoing data packet. This step includes obtaining the value of the SPE 31 which is contained in bit 15, storing it in a FIFO buffer, and incrementing the FIFO input pointer. At step 64, lines 016-022 monitor data packet traffic since the last field sync pulse 29 in order to correctly resync the microprocessor 60 enable pulse. Lines 023-026 (step 65) cause the SPE signal 31 to maintain is state until it is time to change state as depicted in FIG. 4. The calculated delay period is updated at step 66 with lines 027-033, where the delay is incremented once for every three data packets. For a clock frequency of 10.76 MHz, the delay loop is approximately 0.629 microseconds per loop, and the segment precession time of the outgoing data packets is approximately 0.2158 microseconds (0.629/0.2158 is approximately equal to 3).

After completing step 66, lines 034-042 update the gate signal (step 67) in order to suppress the packet associated with a HIGH SPE signal 31. At step 68, lines 043-054 verify the consistency of the packet error count. Since the field sync signal pulse 29 occurs 55 segment sync pulses before the Reed-Solomon decoder 44 sync pulse, at step 69 the microcode lines 055-069 anticipate the occurrence of the decoder 44 sync pulse and resync at the appropriate time. At step 70 the field sync pulse 29 is monitored at lines 070-076, and the entire process is then restarted at step 61.

While this process has been described with reference to particular frequencies, segment delays, and signal paths, etc., the present invention may be tailored to suit other configurations. Further, different protocols may be employed based on the absolute packet error rate or whether or not the packet error rate remains relatively unchanged over a predetermined period of time.

What is claimed is:

1. A system for generating an error signal based on an error encountered while processing a received signal which includes an image representative datastream containing data packets, comprising:

a forward error detecting and correcting decoder which generates a first error signal;

a means for deriving a synchronization signal from the received signal;

a transport processor connected via a bus to the forward error detecting and correcting decoder and the means for deriving a synchronization signal so as to receive the first error signal and the synchronization signal, the transport processor generating a second error signal in response to the first error signal and the synchronization signal, wherein the second error signal begins at an earlier time than an associated data packet, and wherein the second error signal ends at a later time than the associated data packet;

a transport bus for forwarding to subsequent processing stages the data packets after having been processed by the forward error detecting and correcting decoder and wherein the data packets are forwarded as a series of discrete spaced apart frames;

wherein the second error signal is forwarded via the transport bus simultaneously with the data packets associated with the second error signal, wherein the second error signal being adapted to indicate an error in a defective data packet by having a duration that spans the frame of the defective data packet.

2. The system of claim 1, wherein the second error signal assumes a logical low state when no error is present in a data packet.

3. The system of claim 1, wherein the forward error detecting and correcting decoder is a Reed-Solomon decoder.

4. The system of claim 1 wherein the transport processor is implemented as a microprocessor.

* * * * *